(12) United States Patent
Chen et al.

(10) Patent No.: US 9,630,502 B2
(45) Date of Patent: Apr. 25, 2017

(54) DETACHABLE HIGH VOLTAGE ISOLATION STRUCTURE OF MEDIUM-SIZE ELECTRIC VEHICLE

(71) Applicant: Aleees Eco Ark Co. Ltd., Bade, Taoyuan County (TW)

(72) Inventors: Gordon Ching Chen, Bade (TW); Anthony An-Tao Yang, Bade (TW)

(73) Assignee: ALEEES ECO ARK (CAYMAN) CO. LTD., Grand Cayman (KY)

( * ) Notice: Subject to any disclaimer, the term of this patent is extended or adjusted under 35 U.S.C. 154(b) by 0 days.

(21) Appl. No.: 14/906,236

(22) PCT Filed: Jul. 24, 2013

(86) PCT No.: PCT/CN2013/080031
§ 371 (c)(1),
(2) Date: Jan. 19, 2016

(87) PCT Pub. No.: WO2015/010285
PCT Pub. Date: Jan. 29, 2015

(65) Prior Publication Data
US 2016/0167522 A1      Jun. 16, 2016

(51) Int. Cl.
*B60K 1/00*       (2006.01)
*B60L 3/00*       (2006.01)
(Continued)

(52) U.S. Cl.
CPC ........ *B60L 3/0069* (2013.01); *B60H 1/00428* (2013.01); *B60L 1/003* (2013.01); *B60L 11/18* (2013.01); *B62D 5/064* (2013.01); *B60L 2220/42* (2013.01); *B60L 2240/34* (2013.01); *B60L 2270/147* (2013.01); *Y02T 10/648* (2013.01); *Y02T 10/7005* (2013.01)

(58) Field of Classification Search
CPC ........ B60L 3/0069; B60L 11/18; B60L 1/003; B60K 17/165; B60K 1/04; B60K 1/00; B60K 2001/0416; B60K 2001/0477; B60Y 2200/14
See application file for complete search history.

(56) References Cited

U.S. PATENT DOCUMENTS 4,397,365 A * 8/1983 Harbe .................. B60K 1/04
                                                         104/34
5,251,721 A    10/1993 Ortenheim
(Continued)

FOREIGN PATENT DOCUMENTS

CN    101503062 A    8/2009
CN    102105319 A    6/2011
(Continued)

*Primary Examiner* — Drew Brown
(74) *Attorney, Agent, or Firm* — Kirton McConkie; Evan R. Witt

(57) ABSTRACT

A medium-size electric vehicle with a detachable high voltage isolation structure is provided. Due to the detachable high voltage isolation structure, the drawbacks of repairing the high voltage components of the medium-size electric vehicle will be overcome. All of the high voltage components are integrated into the detachable high voltage isolation structure. Consequently, the maintenance worker can repair the medium-size electric vehicle in a safe environment.

7 Claims, 4 Drawing Sheets

(51) Int. Cl.
*B60L 1/00* (2006.01)
*B60L 11/18* (2006.01)
*B60H 1/00* (2006.01)
*B62D 5/06* (2006.01)

(56) References Cited

U.S. PATENT DOCUMENTS

| | | | |
|---|---|---|---|
| 6,397,965 B1 | 6/2002 | McFarlane et al. | |
| 8,453,773 B2 | 6/2013 | Hill et al. | |
| 2006/0101645 A1 | 5/2006 | Stone | |
| 2008/0169139 A1 | 7/2008 | Kramer | |
| 2010/0108416 A1* | 5/2010 | Lind | B60K 1/04 180/65.31 |
| 2011/0014501 A1* | 1/2011 | Scheucher | B60K 1/04 429/7 |
| 2011/0020676 A1* | 1/2011 | Kurosawa | B60K 1/04 429/62 |
| 2011/0068622 A1* | 3/2011 | Ikeno | B60K 1/00 307/10.1 |
| 2011/0240385 A1 | 10/2011 | Farmer | |
| 2013/0000997 A1* | 1/2013 | Peng | B62D 47/02 180/65.6 |
| 2015/0071747 A1* | 3/2015 | Deahl | E21F 13/025 414/469 |
| 2015/0114736 A1* | 4/2015 | Avganim | B60L 11/1822 180/68.5 |
| 2015/0246606 A1* | 9/2015 | Katayama | B60K 1/04 180/65.1 |
| 2016/0001748 A1* | 1/2016 | Moskowitz | B60K 1/04 701/22 |
| 2016/0159221 A1* | 6/2016 | Chen | B60K 17/165 180/53.8 |
| 2016/0200186 A1* | 7/2016 | Hawighorst | B60K 1/04 180/68.5 |

FOREIGN PATENT DOCUMENTS

| | | | | |
|---|---|---|---|---|
| CN | 102463880 A | | 5/2012 | |
| CN | 102582702 A | | 7/2012 | |
| CN | 202879270 U | | 4/2013 | |
| DE | 102005030637 A1 | | 1/2007 | |
| DE | 102010028312 A1 | * | 11/2011 | ............ B60K 1/04 |
| DE | 102011109024 A1 | | 1/2013 | |
| EP | 1951018 A2 | | 7/2008 | |
| GB | 2443272 A | | 8/2007 | |
| GB | 2443272 A | * | 4/2008 | ............ B60K 1/04 |
| JP | H1086679 A | | 4/1998 | |
| JP | H10174211 A | | 6/1998 | |
| WO | 0074964 A1 | | 12/2000 | |
| WO | 2012051969 A | | 4/2012 | |

* cited by examiner

DETACHABLE HIGH VOLTAGE ISOLATION STRUCTURE OF MEDIUM-SIZE ELECTRIC VEHICLE

FIELD OF THE INVENTION

The present invention relates to a detachable high voltage isolation structure, and more particularly to a detachable high voltage isolation structure that integrates all high voltage components of a medium-size electric vehicle therein.

BACKGROUND OF THE INVENTION

Nowadays, many medium-size electric vehicles are driven by electric power instead of internal combustion energy. Since the medium-size electrical vehicle is driven by electric power, a lot of high voltage components are distributed throughout the electric vehicle. If the maintenance worker of the electric vehicle is not well educated about the high voltage knowledge, the maintenance worker is at the risk of getting an electric shock while the maintenance worker repairs the high voltage components and other components of the electric vehicle.

Since the high voltage components cannot be repaired by the maintenance worker, the manufacturer of the electric vehicle has to provide after-sale service to the user. In case that the electric vehicle has a breakdown, the manufacturer of the electric vehicle has to dispatch a professional worker to assist in repairing the electric vehicle. In other words, the maintenance cost is very high.

Moreover, in case that an accident of the electric vehicle happens, some problem occurs. For example, if the doors of the electric vehicle cannot be opened normally, the rescuers have to destroy the vehicle body to increase the rescuing opportunity. Since the high voltage cables and the high voltage components are distributed throughout the vehicle body of the electric vehicle, the rescuers are at the risk of getting electric shocks and the rescue timing is possibly delayed.

Since the high voltage cables and the high voltage components distributed throughout the vehicle body of the electric vehicle, it is difficult to shield the electromagnetic interference. The electromagnetic wave in a large range may adversely affect the health of the passages. In addition, the electromagnetic wave is readily interfered with other electromagnetic waves.

SUMMARY OF THE INVENTION

As previously described, the medium-size electric vehicle has some drawbacks in maintenance, rescue and electromagnetic interference shielding. The present invention is directed to improve the vehicle structure in order to effectively reduce the potential risk in maintenance and rescue and effectively shield the electromagnetic interference.

The present invention has the following objects. A first object is to provide a high voltage isolation structure that is easily maintained and repaired. A second object is to provide a structure for avoiding the rescuers from getting electric shocks while destroying the vehicle body. A third object is to provide a structure for effectively shielding the electromagnetic interference. A fourth object is to provide a high voltage isolation structure that is easily assembled and disassembled.

In accordance with an aspect of the present invention, there is provided a vehicle structure with a detachable high voltage isolation structure. The vehicle structure includes a chassis, the detachable high voltage isolation structure, an axle assembly, a power motor, a detachable transmission shaft, a supplemental steering pump, a supplemental steering motor, a detachable supplemental steering pump connector, an air-conditioning compressor, an air-conditioning motor, a detachable air-conditioning compressor connector, a high voltage battery module, a high voltage cable, and a detachable high voltage cable connector. The detachable high voltage isolation structure is connected with the chassis. The axle assembly is installed on the chassis, and includes a differential mechanism and an axle. The power motor is disposed within the detachable high voltage isolation structure for driving the vehicle structure. The differential mechanism and the power motor are connected with each other through the detachable transmission shaft. The supplemental steering pump is disposed on the chassis for providing hydraulic oil to a steering system. The supplemental steering motor is disposed within the detachable high voltage isolation structure for driving the supplemental steering pump. The supplemental steering motor and the supplemental steering pump are connected with each other through the detachable supplemental steering pump connector. The air-conditioning compressor is disposed on the chassis for producing cool air. The air-conditioning motor is disposed within the detachable high voltage isolation structure for driving the air-conditioning compressor. The air-conditioning compressor and the air-conditioning motor are connected with each other through the detachable air-conditioning compressor connector. The high voltage battery module is disposed on the chassis for providing an electric power. The high voltage cable is installed on the chassis. The electric power is transmitted from the high voltage battery module to the detachable high voltage isolation structure through the high voltage cable. The high voltage cable is connected with the detachable high voltage isolation structure through the detachable high voltage cable connector. While the detachable high voltage isolation structure is detached from the chassis, a combination of the power motor, the supplemental steering motor, and the air-conditioning motor with the detachable high voltage isolation structure is detached from the chassis, and the axle assembly, the supplemental steering pump, the air-conditioning compressor and the high voltage battery module are still connected with the chassis.

In an embodiment, the vehicle structure further includes a cooling channel. The cooling channel is disposed within the detachable high voltage isolation structure.

In an embodiment, the vehicle structure further includes a generator. The generator is installed within the cooling channel.

In an embodiment, the vehicle structure further includes a guide track structure and a guide roller assembly. The guide track structure is installed on the chassis. The guide roller assembly is disposed on the detachable high voltage isolation structure.

In an embodiment, the vehicle structure further includes a supporting rod structure, a positioning recess and a positioning pin. The supporting rod structure is installed in the chassis. The positioning recess is formed in the supporting rod structure. The positioning pin is installed in the detachable high voltage isolation structure.

In an embodiment, the vehicle structure further includes a crane. The crane is installed on the supporting rod structure for vertically ascending or descending the detachable high voltage isolation structure.

In accordance with another aspect of the present invention, there is provided a medium-size electric vehicle. The medium-size electric vehicle includes a detachable power module and an accommodation space. The detachable power module includes a power motor, a motor driver, a supplemental steering motor, an air-conditioning motor and a heat dissipating mechanism. The detachable power module is accommodated within the accommodation space. A transmission shaft connector, a supplemental steering pump connector and an air-conditioning compressor connector are disposed within the accommodation space. The power motor is connected with a vehicle wheel through the transmission shaft connector. The supplemental steering motor is connected with a supplemental steering pump through the supplemental steering pump connector. The air-conditioning motor is connected with an air-conditioning compressor through the air-conditioning compressor connector. While the detachable power module is detached from the medium-size electric vehicle, a combination of the power motor, the motor driver, the supplemental steering motor, the air-conditioning motor and the heat dissipating mechanism with the detachable power module is detached.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
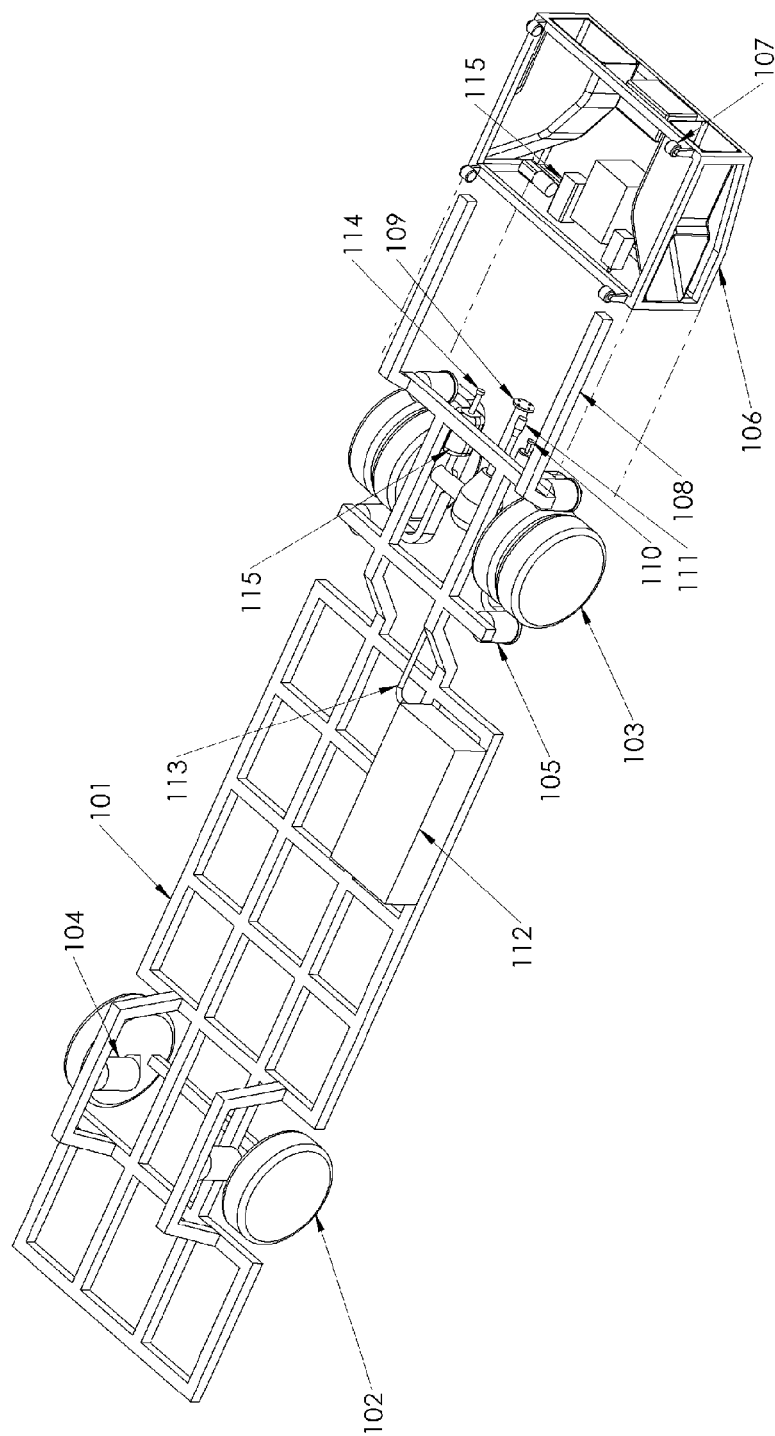
FIG. 1 schematically illustrates a vehicle structure with a detachable high voltage isolation structure according to a first embodiment of the present invention.
Figure 3:
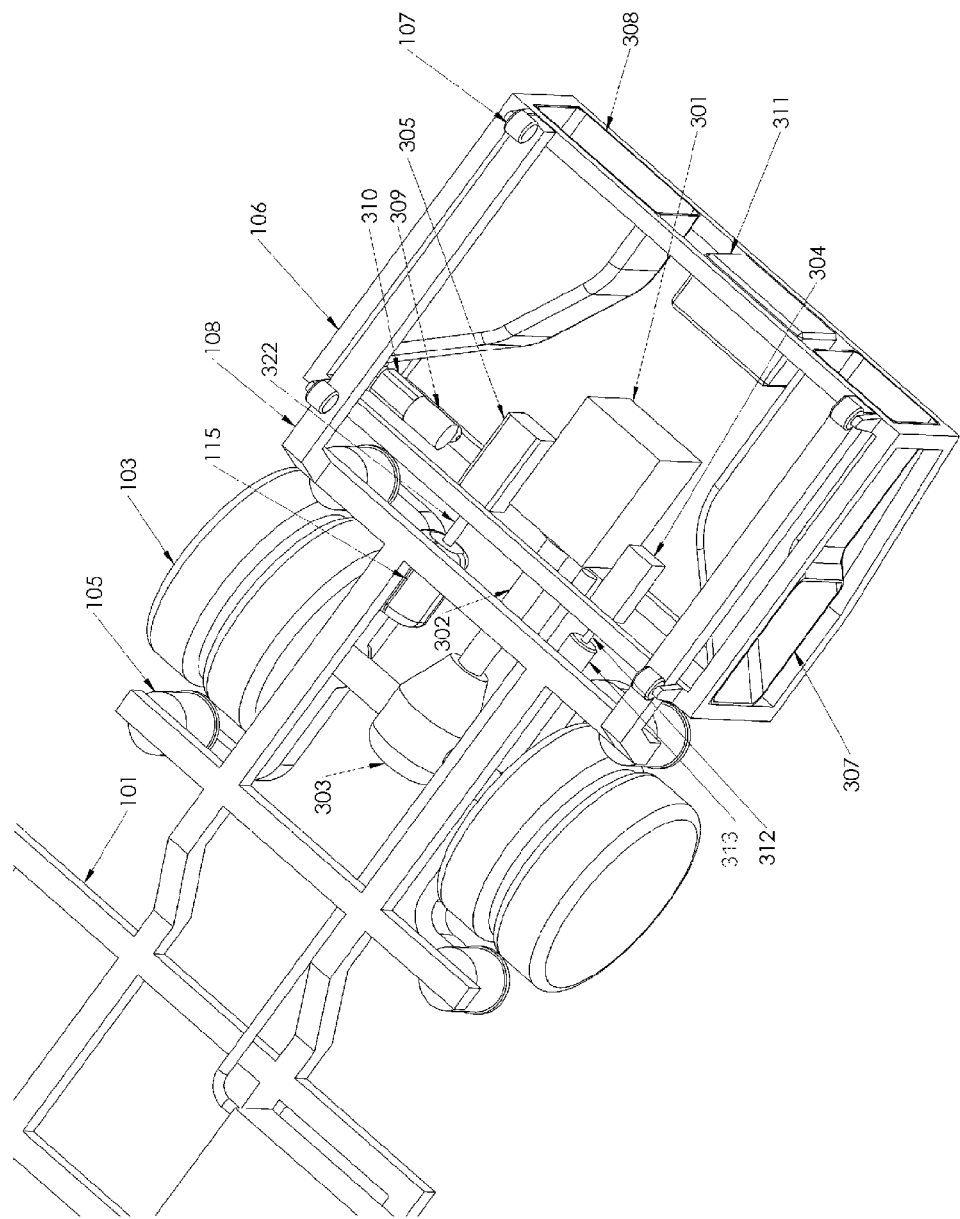
FIG. 3 schematically illustrates a portion of the vehicle structure with the detachable high voltage isolation structure according to the first embodiment of the present invention.
Figure 4:
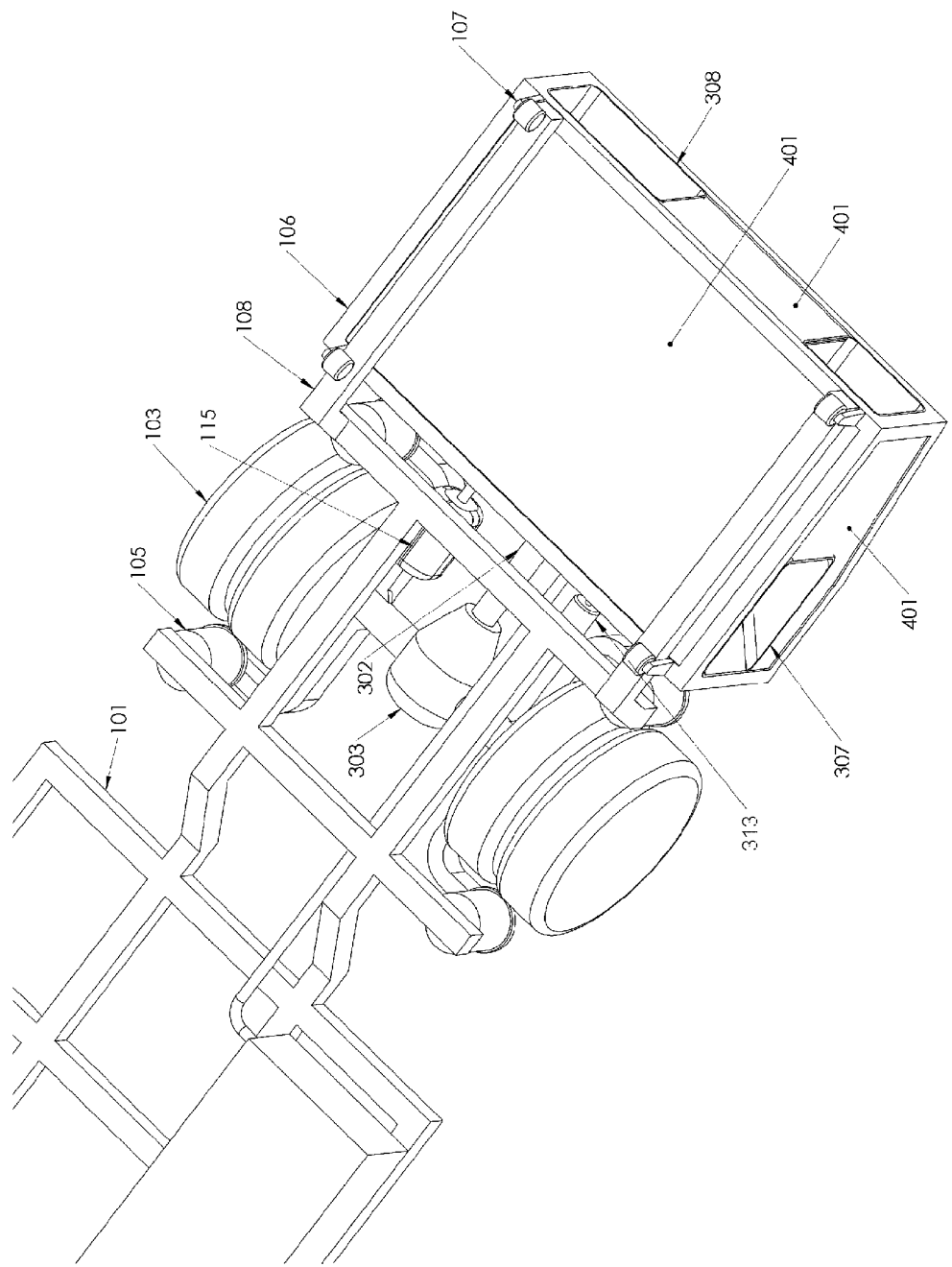
FIG. 4 schematically illustrates the outer appearance of the vehicle structure with the detachable high voltage isolation structure according to the first embodiment of the present invention.

Please refer to FIGS. 1, 3 and 4. FIG. 1 schematically illustrates a vehicle structure with a detachable high voltage isolation structure according to a first embodiment of the present invention. FIG. 3 schematically illustrates a portion of the vehicle structure with the detachable high voltage isolation structure according to the first embodiment of the present invention. FIG. 4 schematically illustrates the outer appearance of the vehicle structure with the detachable high voltage isolation structure according to the first embodiment of the present invention. A chassis 101 is supported by a front axle 102 and a rear axle 103. A front suspension structure 104 is arranged between the chassis 101 and the front axle 102 for withstanding the weight of the vehicle body. A rear suspension structure 105 is arranged between the chassis 101 and the rear axle 103 for withstanding the weight of the vehicle body. A differential mechanism 303 is installed on the rear axle 103 for dispersing the motive power to a left rear wheel and a right rear wheel of the vehicle.

A detachable high voltage isolation frame 106 is located at a rear end of the chassis 101 for accommodating high voltage components. The detachable high voltage isolation frame 106 is an example of the detachable high voltage isolation structure of the present invention. Moreover, a guide track structure 108 is located at the rear end of the chassis 101 for withstanding the weight of the detachable high voltage isolation frame 106. A guide roller assembly 107 is disposed on the detachable high voltage isolation frame 106 and contacted with the guide track structure 108. Due to the guide roller assembly 107, the detachable high voltage isolation frame 106 can be assembled or disassembled more easily.

A high voltage battery module 112 is disposed on the chassis 101 for providing high voltage power that is required for the electric vehicle. Moreover, the high voltage power is transmitted from the high voltage battery module 112 to the inner portion of the detachable high voltage isolation frame 106 through a high voltage cable 113. The high voltage cable 113 is connected with the detachable high voltage isolation frame 106 through a detachable high voltage cable connector 111.

A power motor 301 is disposed within the detachable high voltage isolation frame 106. The power motor 301 is used for generating a torsion force to drive the electric vehicle. The power motor 301 is connected with a transmission shaft 302 through a detachable transmission shaft connector 109. In addition, the torsion force generated by the power motor 301 is sent to the differential mechanism 303 through the transmission shaft 302.

Moreover, a supplemental steering pump 313 is disposed on the chassis 101 for providing hydraulic oil to power a steering wheel. A supplemental steering motor 304 is disposed within the detachable high voltage isolation frame 106 for rotating the supplemental steering pump 313. The supplemental steering motor 304 is connected with a pump axle 312 of the supplemental steering pump 313 through a detachable supplemental steering pump connector 110. Moreover, the supplemental steering motor 304 provides a torsion force to the supplemental steering pump 313 through the pump axle 312.

An air-conditioning compressor 115 is installed on the chassis 101 for producing cool air. Moreover, an air-conditioning motor 305 is disposed within the detachable high voltage isolation frame 106 for rotating the air-conditioning compressor 115. The air-conditioning motor 305 is connected with the air-conditioning compressor 115 through a detachable air-conditioning compressor connector 114. The air-conditioning motor 305 provides a torsion force to the air-conditioning compressor 115 through a pump axle 322 of the air-conditioning compressor 115.

An air compressor 309 is disposed within the detachable high voltage isolation frame 106 for providing compressed air that is required for the electric vehicle. Moreover, an air compressor motor 310 is disposed within the detachable high voltage isolation frame 106 for driving the air compressor 309.

Moreover, a left cooling channel 307 and a left cooling channel 308 are disposed within the detachable high voltage isolation frame 106 for dissipating the heat to the surroundings.

Moreover, a motor driver 311 is disposed within the detachable high voltage isolation frame 106 for providing electric power to all motors. In addition, plural electromagnetic interference shields 401 are installed on the detachable high voltage isolation frame 106 for shielding electromagnetic interference.

In accordance with the designed concept of the present invention, all of the high voltage components are integrated into a detachable high voltage isolation structure. Moreover, these high voltage components are isolated by suitable means, and a separation point for easily assembling and dissembling the detachable high voltage isolation structure is provided. Consequently, while the electric vehicle is repaired, the possibility of resulting in contact between the maintenance worker and the high voltage components is minimized, and the isolation structure is completely detached by the maintenance worker. Under this circumstance, the risk of getting an electric shock will be minimized. Moreover, since the high voltage components are integrated into the isolation structure, the number of the high voltage cables is largely reduced. Consequently, in case that an accident of the electric vehicle happens, the rescuers can destroy the vehicle body under a more safe condition.

The main high voltage component within the isolation structure is the power motor. Since the casing of the power motor and the internal high voltage coil of the power motor are insulated from each other, it is feasible to allow the casing of the power motor and the isolation structure to be connected to the ground. Moreover, by using the detachable transmission shaft connector, the power motor can be easily detached from the mechanical structure of the vehicle body.

The air-conditioning compressor is another main high voltage component. Generally, the air-conditioning compressor of the current medium-size electric vehicle is installed on the top of the vehicle body. Although the installation of the air-conditioning compressor on the top of the vehicle body is easy, some drawbacks occur. For example, the high voltage power has to be sent to the top of the vehicle body. For providing the high voltage power, it is necessary to install the high voltage cable in the lateral plate of the vehicle body. In case that an accident of the electric vehicle happens, the high voltage cable is possibly damaged and the passages are at the risk of getting electric shocks. In this embodiment of the present invention, the air-conditioning compressor is disposed on the chassis, and the air-conditioning motor is disposed within the isolation structure. Moreover, the air-conditioning motor and the air-conditioning compressor are connected with each other through the detachable air-conditioning compressor connector. Moreover, while the whole isolation structure is disassembled, the region between the air-conditioning motor and the air-conditioning compressor can be used as the separation point of the air-conditioning system.

Another important high voltage component is the steering wheel. The steering wheel of the current medium-size electric vehicle is a hydraulic steering wheel. In addition, an electric pump is located near the driver's seat. According to this design, a high voltage cable has to be installed near the driver seat. The steering wheel used in the present invention is also a hydraulic steering wheel. Since the supplemental steering pump is installed at the tail side of the vehicle body and the corresponding motor is installed in the isolation structure, it is not necessary to install the high voltage cable near the driver's seat. Like the power motor, the casing of the supplemental steering motor and the internal high voltage coil of the supplemental steering motor are insulated from each other. Moreover, the region between the supplemental steering motor and the supplemental steering pump is also used as a separation point.

Similarly, the air compressor is disposed within the isolation structure. The air compressor is in communication with an air storage tank through an insulated air conduit. The insulated air conduit can be used as the separation point of the air pressure system.

In this embodiment, the isolation structured is sealed by the electromagnetic interference shields. Consequently, a centralized cooling system is used. That is, after the components of the isolation structure to be cooled are cooled by the cooling water, the cooling water is transferred to the left cooling channel and the left cooling channel to dissipate the heat to the surroundings. Similarly, a heat exchanger of the air-conditioning system is installed in the left cooling channel or the left cooling channel. As mentioned above, the isolation structure is a seal structure. If the internal combustion generator is installed within the isolation structure, the heat generated by the internal combustion generator will overheat the inner portion of the isolation structure. In case that the internal combustion generator is required, the internal combustion generator is installed in the cooling channel. Consequently, the generator and the isolation structure can be collaboratively detached, and the internal temperature of the isolation structure will not be excessively high.

Moreover, during the maintenance process of the electric vehicle, the architecture of the present invention can assure the safety of the maintenance worker. In case that the electric vehicle has the breakdown, the maintenance worker can firstly judge whether the internal components of the isolation structure are damaged according to defect codes. If the internal components of the isolation structure are damaged, the whole isolation structure is disassembled and replaced with a spare isolation structure. In addition, the entire of the damaged isolation structure is sent to the manufacturer for acquiring the after-sale service. In case that only the component outside the isolation structure is damaged, the damaged component can be repaired by the maintenance worker safely. For enhancing the maintenance safety, the maintenance worker may temporarily disassemble the isolation structure during the maintenance process. Since the range of the high voltage components is confined by the isolation structure, the maintenance worker can be effectively protected. Moreover, the requirement of dispatching a professional worker to assist in repairing the electric vehicle will be reduced.

In case that an accident of the electric vehicle happens and the rescuers have to destroy the vehicle body to increase the rescuing opportunity, it is important to confirm that the destroyed site does not contain the high voltage components. Since all high voltage components are integrated and isolated, the rescuers will not get electric shocks if the rescuers keep away from the high voltage battery module, the high voltage cable and the high voltage isolation structure. In particular, since the high voltage battery module, the high voltage cable and the high voltage isolation structure are disposed on the chassis, no high voltage components or high voltage cables are installed on the top and the lateral side of the vehicle body.

In accordance with another designing concept of the present invention, the electromagnetic interference can be easily shielded. Since the high voltage components are integrated into the isolation structure, the length of the high voltage cable can be effectively reduced. Under this circumstance, the electromagnetic interference generated by the high voltage cable is reduced. Moreover, since all high voltage components are integrated into the isolation frame, the shielding structure of the overall isolation frame can effectively reduce the electromagnetic interference of the motor and the corresponding driver.

Optionally, plural maintenance holes are formed in the vehicle cabin. After the maintenance holes are opened, the maintenance worker can detach the motor connector, the supplemental steering pump connector, the air conduit, the air-conditioning compressor connector, the high voltage cable connector and other corresponding separation points. Consequently, even if there is no lift equipment, the whole high voltage isolation structure can be detached quickly. In other words, the emergence repair of the vehicle in the factory or on the road side can be effectively done. After the connection points are separated, the isolation structure can be detached from the chassis. Consequently, the isolation structure can be pulled out through the guide track structure and the guide roller assembly.

Figure 2:
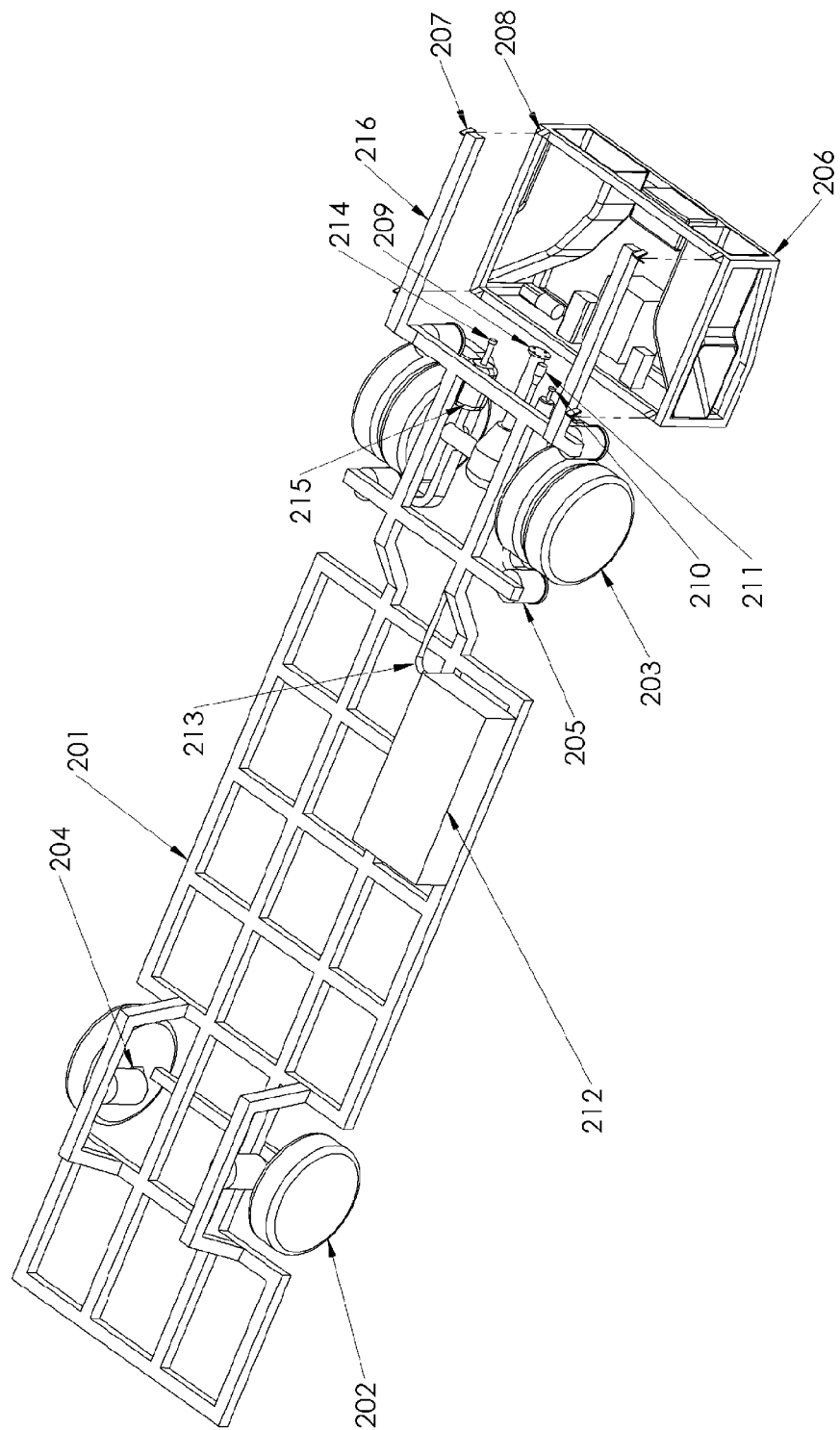
FIG. 2 schematically illustrates a vehicle structure with a detachable high voltage isolation structure according to a second embodiment of the present invention.

FIG. 2 schematically illustrates a vehicle structure with a detachable high voltage isolation structure according to a second embodiment of the present invention. A chassis 201 is supported by a front axle 202 and a rear axle 203. A front suspension structure 204 is arranged between the chassis 201 and the front axle 202 for withstanding the weight of the vehicle body. A rear suspension structure 205 is arranged between the chassis 201 and the rear axle 203 for withstanding the weight of the vehicle body.

A detachable high voltage isolation frame 206 is located at a rear end of the chassis 201 for accommodating the high voltage components. Moreover, a supporting rod structure 214 is located at the rear end of the chassis 201 for withstanding the weight of the detachable high voltage isolation frame 206. Moreover, plural positioning pins 208 are disposed on the detachable high voltage isolation frame 206 and engaged with the corresponding positioning recesses 207. Consequently, the detachable high voltage isolation frame 206 can be assembled or disassembled more easily.

A high voltage battery module 212 is disposed on the chassis 201 for providing high voltage power that is required for the electric vehicle. Moreover, the high voltage power is transmitted from the high voltage battery module 212 to the inner portion of the detachable high voltage isolation frame 206 through a high voltage cable 213. The high voltage cable 213 is connected with the detachable high voltage isolation frame 206 through a detachable high voltage cable connector 211. Moreover, the torsion force is provided to the supplemental steering system through a supplemental steering pump connector 210. An air-conditioning compressor 215 is installed on the chassis 201 for producing cool air. Moreover, a torsion force is sent to the air-conditioning compressor 215 through a detachable air-conditioning compressor connector 214.

The structure of the second embodiment is similar to the structure of the first embodiment. In comparison with the first embodiment, the second embodiment uses the positioning recesses and the positioning pins for facilitating the assembling procedure and the disassembling procedure and employs the suspension structure. For further facilitating the assembling procedure and the disassembling procedure, the vehicle body is further equipped with a small crane. The crane is installed on the supporting rod structure. In the disassembling procedure, the small crane is vertically descended to the floor and then the isolation structure is pulled out. In the installing procedure, the isolation structure is firstly slid to the region under the supporting rod structure, and then ascended by the small crane. Afterwards, the isolation structure is combined the supporting rod structure and the chassis.

What is claimed is:
1. A vehicle structure with a detachable high voltage isolation structure, the vehicle structure comprising:
a chassis;
the detachable high voltage isolation structure connected with the chassis;
an axle assembly installed on the chassis, and comprising a differential mechanism and an axle;
a power motor disposed within the detachable high voltage isolation structure for driving the vehicle structure;
a detachable transmission shaft, wherein the differential mechanism and the power motor are connected with each other through the detachable transmission shaft;
a supplemental steering pump disposed on the chassis for providing hydraulic oil to a steering system;
a supplemental steering motor disposed within the detachable high voltage isolation structure for driving the supplemental steering pump;
a detachable supplemental steering pump connector, wherein the supplemental steering motor and the supplemental steering pump are connected with each other through the detachable supplemental steering pump connector;
an air-conditioning compressor disposed on the chassis for producing cool air;
an air-conditioning motor disposed within the detachable high voltage isolation structure for driving the air-conditioning compressor;
a detachable air-conditioning compressor connector, wherein the air-conditioning compressor and the air-conditioning motor are connected with each other through the detachable air-conditioning compressor connector;
a high voltage battery module disposed on the chassis for providing an electric power;
a high voltage cable installed on the chassis, wherein the electric power is transmitted from the high voltage battery module to the detachable high voltage isolation structure through the high voltage cable; and
a detachable high voltage cable connector, wherein the high voltage cable is connected with the detachable high voltage isolation structure through the detachable high voltage cable connector,
wherein while the detachable high voltage isolation structure is detached from the chassis, a combination of the power motor, the supplemental steering motor, and the air-conditioning motor with the detachable high voltage isolation structure is detached from the chassis, and the axle assembly, the supplemental steering pump, the air-conditioning compressor and the high voltage battery module are still connected with the chassis.

2. The vehicle structure with the detachable high voltage isolation structure according to claim 1, further comprising a cooling channel, wherein the cooling channel is disposed within the detachable high voltage isolation structure.

3. The vehicle structure with the detachable high voltage isolation structure according to claim 2, further comprising a generator, wherein the generator is installed within the cooling channel.

4. The vehicle structure with the detachable high voltage isolation structure according to claim 1, further comprising a guide track structure and a guide roller assembly, wherein the guide track structure is installed on the chassis, and the guide roller assembly is disposed on the detachable high voltage isolation structure.

5. The vehicle structure with the detachable high voltage isolation structure according to claim 1, further comprising a supporting rod structure, a positioning recess and a positioning pin, wherein the supporting rod structure is installed in the chassis, the positioning recess is formed in the supporting rod structure, and the positioning pin is installed in the detachable high voltage isolation structure.

6. The vehicle structure with the detachable high voltage isolation structure according to claim 5, further comprising a crane, wherein the crane is installed on the supporting rod structure for vertically ascending or descending the detachable high voltage isolation structure.

7. A medium-size electric vehicle, comprising:
- a detachable power module comprising a power motor, a motor driver, a supplemental steering motor, an air-conditioning motor and a heat dissipating mechanism; and
- an accommodation space for accommodating the detachable power module, wherein a transmission shaft connector, a supplemental steering pump connector and air-conditioning compressor connector are disposed within the accommodation space, wherein the power motor is connected with a vehicle wheel through the transmission shaft connector, the supplemental steering motor is connected with a supplemental steering pump through the supplemental steering pump connector, and the air-conditioning motor is connected with an air-conditioning compressor through the air-conditioning compressor connector,
wherein while the detachable power module is detached from the medium-size electric vehicle, a combination of the power motor, the motor driver, the supplemental steering motor, the air-conditioning motor and the heat dissipating mechanism with the detachable power module is detached.

* * * * *